July 21, 1970 W. R. BURRUS 3,521,239
TOTALIZING MEMORY FOR MULTICHANNEL ANALYZERS
WITH INCREASED CAPACITY
Filed Jan. 16, 1968
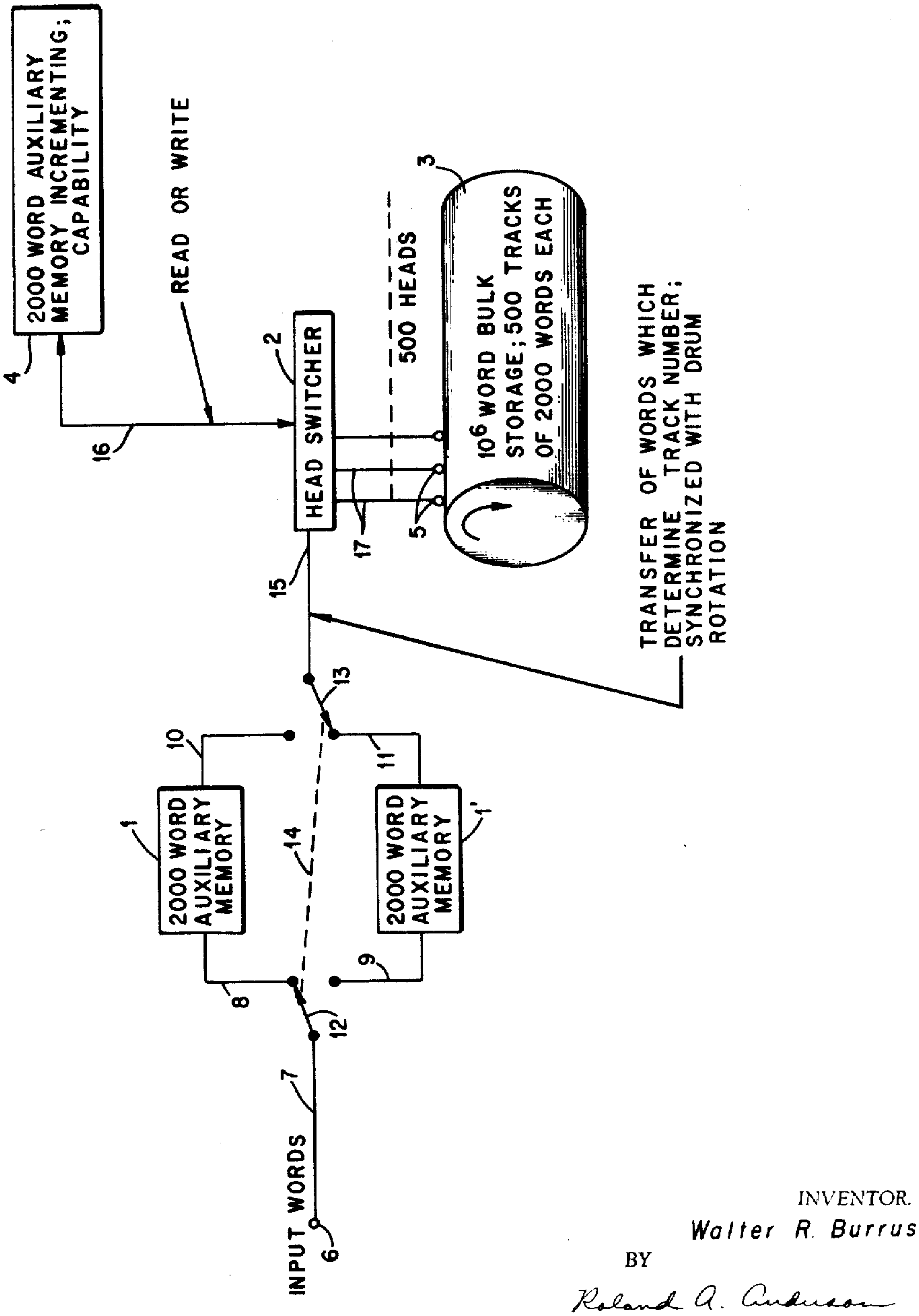
INVENTOR.
Walter R. Burrus
BY
Roland A. Anderson
ATTORNEY United States Patent Office 3,521,239
Patented July 21, 1970

3,521,239
TOTALIZING MEMORY FOR MULTICHANNEL ANALYZERS WITH INCREASED CAPACITY

Walter R. Burrus, Oak Ridge, Tenn., assignor to the United States of America as represented by the United States Atomic Energy Commission Filed Jan. 16, 1968, Ser. No. 698,338
Int. Cl. G11b *5/00*
U.S. Cl. 340—172.5 5 Claims

ABSTRACT OF THE DISCLOSURE

An incrementing memory system for data rates of $10^4$ words per second utilizes a large capacity magnetic storage unit together with a controller and appropriate auxiliaries whereby up to several hundred words of data are batched and counted within two revolutions of the storage unit in contrast to one word at a time. A "totalizing digital memory" counts the number of random occurrences of a data word, rather than storing the word itself as in a conventional digital memory.

BACKGROUND OF THE INVENTION

The invention described herein was made in the course of, or under, a contract with the U.S. Atomic Energy Commission.

The field of art to which the invention pertains is data handling systems wherein raw data are conventionally passed through a pulse height analyzer. The raw data may be obtained from scintillation couuting, Mossbauer analysis, time-of-flight spectroscopy, etc., for example. The output from the pulse height analyzer is a series of random numbers or data words, as a function of time, with each number relating to the height of a pulse or the duration of a time interval. These numbers must then be analyzed for an understanding of the processes which generate the data, and, in the handling of such data, it is necessary, for example, to know how many times a particular output word is generated by the analyzer, i.e., the totalizing of the events in a "channel."

The development of prior data handling devices has progressed from those involving one channel up to those of several tens of thousands of channels. Various basic types of data handling devices have been and are being utilized and include magnetic core analyzers with speeds of $10^6$ data words/sec., but which, for a large number of channels, are very expensive. For example, a $10^6$ channel magnetic core unit would cost in excess of $400,000. A Burroughs Corportation rotating magnetic storage unit has a substantially lower cost per channel but heretofore was limited in its speed of totalizing random data to the rotating rate, e.g., about 30 counts/sec. which is substantially below the desired 10,000 counts/sec. The relatively slow counting speed of such a device is a result of handling only one word at a time therewith. Thus, there exists a need for a data handling system wherein the counting speed thereof can be substantially increased, while at the same time minimizing the initial cost of such a system.

SUMMARY OF THE INVENTION

With a knowledge of the above limitations of the prior art, it is the object of the present invention to provide a data handling system which takes advantage of the lower cost of modern rotating magnetic storage devices while at the same time providing means in the system to substantially increase the counting speed thereof so as to adequately handle information generated by contemporary nuclear instrumentation data generating circuits.

Some of the raw data for which an analysis thereof is desired includes neutron cross-section measurements for nuclear reactor physics and designs, studies of the fission process, measurements for transplutonium isotopes, radiation chemistry studies, and solid state studies.

The above object has been accomplished in the present invention by utilizing a commercially available, rapid-access memory unit in combination with auxiliary storage memory units in such a manner that several hundred channels can be processed simultaneously and thus counting rates of several thousand per second can be achieved which match the output speeds of most nuclear instrumentation, which could not heretofore be achieved with prior devices.

BRIEF DESCRIPTION OF THE DRAWING

The single figure in the drawing shows a block diagram of the system for accomplishing the above-mentioned object.

DESCRIPTION OF THE PREFERRED EMBODIMENT

In the drawing, input data are fed from a conventional pulse height digitizer, not shown, to an input terminal 6, and then by means of a multilead cable 7, a switch 12, and a multilead cable 8 into a 2000-word auxiliary storage memory unit 1. During the time that data are being stored in unit 1, data that were previously stored in a 2000-word auxiliary storage memory unit 1', during a previous cycle when the switch 12 was in its other position and terminal 6 was connected to unit 1' by a multilead cable 9, are utilized to effect associated head switching circuitry 2 by means of a multilead cable 11, switch 13, and a multilead cable 15 such that appropriate heads 5 are selected by their associated leads 17 to effect the reading out of selected and associated channels of the $10^6$ word bulk storage unit 3 onto a third auxiliary 2000-word storage memory unit 4 by means of a multilead cable 16, during one revolution of the unit 3. One count is then added in each of the read-out channels by the unit 4 and the unit 4 effects the re-recording of the new values back onto the bulk storage unit 3 during the next revolution thereof.

It should be understood that switch 12 is electronically coupled to switch 13 by means of a coupling 14 such that, while the data from the memory unit 1' are being totalized in the manner indicated above, new input data are being batched by the memory unit 1. At the end of the totalizing cycle, the positions of the switches 12 and 13 are electronically reversed and the stored data now in memory unit 1 are totalized by the units 2, 3, and 4, while additional input data are now batched by the memory unit 1'. Thus, the totalizing and batching cycles are repeated over and over again in a rapid manner such that several hundred channels are processed for each two revolutions of the unit 3 and counting rates of several thousand per second are achieved which can match the output speeds of most nuclear instrumentation.

The rotary magnetic storage unit 3 may be either a disc type or drum type. A typical drum storage unit, such as manufactured by the Burroughs Corporation, is rotatable at speeds up to 3600 r.p.m. with 500 circumferential tracks spaced along its length with 2000 "count" (or channel) positions along each track. Thus, the total channel capacity is $500\times 2000$, or $10^6$. Each track is provided with a head for either reading the information stored on the drum or recording new information thereon.

A typical disc-type storage unit 3 may be, for example, Model No. 7302, manufactured by the Digital Development Corporation, a subsidiary of the Xebec Corporation, San Diego, Calif. In such a unit, there are four discs provided with each surface of each disc having 64 data tracks, or 128 tracks per disc. Thus, with four discs, up to 512 data tracks are provided. Recording-reading heads are organized in groups of 64, and each group services one disc surface. Such a disc unit is rotatable at speeds up to 3600 r.p.m. and has a total rated capacity of $23.04\times10^6$ bits.

The auxiliary storage memories 1 and 1', the auxiliary storage memory 4 with its incrementing capability, and the head switching circuitry 2 may be a portion of the fast memory of a computer system which exercises control of the system. An example of a typical computer which can be utilized in the present invention is the General Purpose Digital Computer, Model SEL 810, manufactured by Systems Engineering Laboratories, Inc., Fort Lauderdale, Fla.

To illustrate the operation of the present invention, let it be assumed that ten data words (rather than several hundred) are to be totalized by the system. These numbers, in their chronological order, might be:

| | |
|---|---|
| $t_1$—137,142 | $t_6$—212,415 |
| $t_2$—212,417 | $t_7$—42,312 |
| $t_3$—1,317 | $t_8$—76,042 |
| $t_4$—142,120 | $t_9$—663,211 |
| $t_5$—722,130 | $t_{10}$—609,478 |

These numbers would be stored in auxiliary memory 1 as follows: in position #137, the track #142; in position #212, the track #417; in position #1, the track #317; etc. Then, following storage of these numbers and the switches 12 and 13 are in their other positions, the numbers stored in auxiliary memory 1 activate appropriate heads 5 of the bulk storage unit 3 via the head switching unit 2 so that the stored information on the associated channels on the drum of unit 3, corresponding to the contents of auxiliary memory unit 1, is read into the auxiliary memory unit 4 as the drum of unit 3 is rotated one revolution. Each word stored in unit 4 is then increased by one and these incremented words are then placed back on the drum of storage unit 3 during the next revolution thereof. It should be noted that the numbers at $t_2$ and $t_6$ both require a count to be incremented at the 212th position, one in track #417 and one in track #415. It is impossible to increment both counts simultaneously. This situation occurs at random times depending upon the statistical distribution of input numbers. When this situation arises, it may be handled in two ways: omit the second number (at $t_6$) at a small counting loss, or save it until a later rotation. After this totalizing cycle has been completed, the switches 12 and 13 are moved to their other positions and a new totalizing cycle is begun with the information now stored on the memory unit 1'.

It should be understood that the actuation of switches 12 and 13 to their alternate positions is synchronized with the rotation of the drum of unit 3 such that the positions of the switches are changed for each two revolutions of the unit 3 drum. Since the drum of unit 3 normally rotates at 3600 r.p.m., or 60 r.p.s., it can be seen that the switches 12 and 13 change their positions 30 times each second such that with the system of the present invention at least 10,000 counts/sec. can be stored or totalized on the unit 3 drum, which is substantially above the 30 counts/sec. achievable with similar prior devices.

It should be understood that the present invention is primarily concerned with the rapid acquisition of data. The final analysis of the acquired data may be analyzed by a large computer facility such as an IBM 360/75 computer.

The cost of the data acquisition system of the present invention is about one-eighth of the cost of the above-mentioned $10^6$ channel magnetic core analyzer.

This invention has been described by way of illustration rather than limitation and it should be apparent that it is equally applicable in fields other than those described.

What is claimed is:

1. A method for the rapid acquisition of data comprising the steps of storing several hundred input numbers in an auxiliary storage device, reading several hundred corresponding channels from a bulk storage drum corresponding to said store numbers in said auxiliary storage device during one revolution of said drum, adding one to the number read from each channel, and recording the several hundred incremented channels onto said drum during the next revolution thereof, and repeating said steps as many times as desired.

2. An improved system for the rapid acquisition of data comprising a rotating magnetic bulk storage unit for storing up to $10^6$ words, said storage unit being provided with a plurality of fixed read-write heads; a first auxiliary memory unit; a second auxiliary memory unit; an input terminal for receiving input words from a pulse height digitizer; a head switching circuitry associated with said heads of said bulk storage unit; means connecting said input words to one of said auxiliary memory units while at the same time connecting the other of said auxiliary memory units to said head switching circuitry; means for reversing the positions of said connections such that the connections of said auxiliary memory units to said input terminal and to said head switching circuitry are alternately reversed after each two revolutions of said bulk storage unit; a third auxiliary memory unit provided with incrementing capability; means for connecting said third auxiliary memory unit to said head switching circuitry; each of said first and second auxiliary memory units including means for effecting the actuating of a plurality of said heads as a function of the number of words stored in the then connected auxiliary memory unit to effect the reading out of corresponding channels from said bulk storage unit onto said third auxiliary memory unit by said connecting means between said head switching circuitry and said third auxiliary memory unit during one revolution of said bulk storage unit, said third auxiliary memory unit including means for incrementing each of said read-out channels by "one" and then effecting the re-recording of each of said incremented channels back onto said bulk storage unit during the next revolution thereof, whereby as one of said first and second auxiliary memory units is batching input data from said input terminal, the other of said first and second auxiliary memory units in combination with said head switching circuitry and third auxiliary memory unit is effecting the totalizing of stored data therein onto said bulk storage unit.

3. The system set forth in claim 2, wherein each of said first, second, and third auxiliary memory units has a storage capacity of at least 2000 words, said input words being totalized by said system at a rate of at least 10,000 counts per second.

4. The system set forth in claim 3, wherein said bulk storage unit is a drum type.

5. The system set forth in claim 3, wherein said bulk storage unit is a disc type.

References Cited

UNITED STATES PATENTS 2,905,930 9/1959 Golden ____________ 340—174

RAULFE B. ZACHE, Primary Examiner